United States Patent Office 3,516,838
Patented June 23, 1970

3,516,838
INTERMEDIATE MOISTURE FOODSTUFFS CONTAINING REDUCED POLYSACCHARIDES
Robert N. Du Puis, Chappaqua, N.Y., assignor to General Foods Corporation, White Plains, N.Y., a corporation of Delaware
No Drawing. Filed July 14, 1966, Ser. No. 565,094
Int. Cl. A23l 3/34; A23b 1/14
U.S. Cl. 99—150   6 Claims

ABSTRACT OF THE DISCLOSURE

Intermediate moisture food products, and processes for treating the same comprising incorporating into said intermediate moisture products, water soluble reduced edible polysaccharides of partial starch hydrolyzates and partially depolymerized rearranged starch in which the aldehydo groups have been at least partially converted to methylol groups.

This invention relates to formulation of foodstuffs prone to undergo non-enzymatic browning and the prevention thereof. More particularly, the invention is concerned with the advantageous arresting of the tendency of intermediate moisture foodstuffs, e.g., 10–40% moisture containing Maillard-type reaction precursors to undergo premature browning and thereby interfere with or detract from the acceptability of the foodstuffs.

Intermediate moisture products typified by meat and vegetable matrix mixtures having a moisture content in the neighborhood of 15 to 30% are becoming of increasing importance to the food industry. Such intermediate moisture products can be advantageously stabilized against micro-organic decomposition by the employment of a bacteriostatic level of water soluble solids, which serve to stabilize such matrix material against the development of putrefactive and other spoilage organisms. The most common of these water solubles are materials such as sucrose and dextrose which are generally of the class edible water soluble organic materials and serve to cause a significant increase in osmotic pressure to the solution infusing the matrix material, whereby the matrix materials are stabilized against bacterial and other growth or may be assisted in this regard through the overt employment of bacteriostats and/or antimycotics. Such compounds, however, suffer from one or the other disadvantages; in the case of saccharides such as sucrose, to be effective they must be employed at a substantial level by weight of the intermediate moisture product; but in some products due to the sweetness of the sucrose, the use thereof must be curtailed. On the other hand, products such as dextrose may be employed at a lower level than sucrose to achieve an equivalent bacteriostasis in the so-called intermediate moisture range aforesaid, but are in the class of so-called reducing saccharides and hence, are prone to undergo rapid development of an undesirable "browning" or Maillard-type reaction; as a consequence, the use of starch solids and the like in intermediate moisture products has been limited.

A need exists for a stabilizing solute which, like sucrose and dextrose, is palatable and operative in the aforesaid intermediate moisture range, but has a comparatively bland taste organoleptically compatible with other flavors and does not undergo non-enzymatic browning during storage; such product should preferably be of low cost and hence, be preferably derivable directly from edible material at the so-called raw or crop stage of refinement.

The present invention has as its object the prevention of the tendency of water soluble polysaccharides from undergoing an undesirable Maillard-type reaction in the aforesaid intermediate moisture range, while at the same time providing said saccharides in a form where they are functional in stabilization against bacteriological and other growth.

Briefly stated, the present invention involves: incorporation in foodstuffs prone to undergo the aforesaid Maillard reaction in an intermediate moisture range of water soluble reduced polysaccharides selected from the class consisting of reduced partial starch hydrolyzates and reduced partially depolymerized rearranged starch in syrup or other form. For convenience of reference, the aforesaid class members will be generically referred to hereinafter as reduced polysaccharides, reference to such generic classification being understood to be applicable to the respective class members. Reduction of said soluble polysaccharides may be effected by means such as catalytic hydrogenation, by sodium borohydride or electrolytic reduction so as to convert the reactive aldehydo groups of the starch derivative to methylol groups and thereby suspend the (Maillard) browning reaction.

The invention will find its most immediate application in the formulation of foodstuffs wherein the reduced polysaccharides are substituted in whole or in part for sugar; typical of such foodstuffs are those of the type disclosed in Burgess et al., U.S. Pat. No. 3,202,514, dated Aug. 24, 1965, entitled "Animal Food and Method of Making the Same." Thus, tuber or cereal syrups containing partial starch hydrolyzates derived by enzymatic, acidic or alkaline treatment or combinations of these techniques may be substantially reduced and by virtue of their water solubility and effect on osmotic pressure can be substituted in whole or in part for "sugars" of the type set forth in the aforesaid Burgess et al. patent, as that term is defined therein. Typically, a reduced polysaccharide mixture in the form of a hydrogenated corn syrup digest can be employed as a total or partial substitute for one of the sugars as that term is defined in said patent in stabilizing the matrix materials of the foodstuffs. The reduced polysaccharide level is not to be restricted, however, to the sugar level of use set forth in said patent; rather the reduced polysaccharide may be employed over a much wider range. In the case of an intermediate moisture foodstuff, as that term is hereinafter defined, the reduced polysaccharide level expressed as a weight of the total foodstuff may range from 1–50% of the composition, the weight level being determined by the degree of substitution for or supplementation to the water soluble solids otherwise present and functional in stabilizing the intermediate moisture product against growth of micro-organisms. The level of reduced polysaccharides will also be determined to a large degree by the moisture content of the foodstuff, the requisite level of reduced polysaccharide increasing as the level of moisture increases. Advantageously, a reduced polysaccharide is less sweet than a water soluble solid such as sucrose and can be employed without undergoing browning during storage of the intermediate moisture product. For the sake of definition the term "intermediate moisture" will be understood to apply to those products having a moisture content in excess of 10% and less than 40% and more typically in the neighborhood of 15–35%.

By virtue of the aforesaid bland low sweetness character of reduced polysaccharides of the aforestated type, the range of utility of the aforesaid class of intermediate moisture products can be expanded into areas where the food might otherwise be less advantageously flavored as in the case of a food which, in addition to containing a meat and/or vegetable component to be stabilized, contains sucrose which would not be organoleptically compatible with the primary taste required for such a product. In meat and other entrees, the reduced polysaccharides employed in accordance with the present invention will serve to provide a desired moisture retention, and neutral flavor as well as a requisite high level of an economic source of solutes.

In the case of aerobically packed cellophane wrapped non-hermetically sealed products, the food composition will usually be stabilized when the total water soluble solids level, including the level of reduced polysaccharides, is in excess of the moisture content of the product; preferably such an intermediate moisture product will be of a neutral pH, say ranging from 6.0 to 7.5, although it is practical to formulate such a product at a pH below 6.0 and enjoy the benefits of bacteriostasis, as by the addition of an acidulant as an adjunct to bacteriostasis.

The reduced polysaccharides may be employed to advantage in the formulation of other intermediate moisture foodstuffs as bacteriostatic stabilizing solutes, e.g., hot packed commercially sterilized meat and/or vegetable-containing products such as sausage, luncheon meats and the like. Reduced polysaccharides will be eminently useful for the treatment of processed animal tissue wherein it is desired to retain the characteristic flavor of the meat, e.g., fresh pork and beef sausage, hamburger, fish and the like, preferably in a pasteurized commercially sterile condition substantially free of pathogenic organisms. The reduced polysaccharides can also be employed in the total or partial replacement of sugars in the treatment of smoked, salted and cured animal tissue such as hams, bacon and fish.

A number of other applications will be readily apparent to those skilled-in-the-art, and which will also involve the use of the reduced polysaccharides as a solute under conditions where non-enzymatic browning may not be as serious a problem as otherwise.

While use of reduced corn syrup solids is a preferred embodiment of the present invention, the invention contemplates broadly the reduction and use of any edible partial starch hydrolyzate or partially depolymerized rearranged starch containing one or more carbonyl-containing groups which are capable of undergoing a Maillard-type reaction through condensation with the amino group of a portein, polypeptide or amino acid in the first group of polysaccharides set forth hereinbelow, i.e., partial starch hydrolyzates which typically have a dextrose equivalent ranging from 10 to 70 D.E. and like hydrolyzate mixtures containing oligosaccharides and polysaccharides, derived from amyloceous and amylopectinaceous materials. Representative of this group of hydrolyzates are: acid and enzymatically derived starch digests relatively high in such saccharides as maltose, malto-triose, malto-tetrose, malto-pentose; and more highly polymerized forms of dextrose in either straight or branched form. Representative of the second group mentioned hereinabove, i.e., the partially depolymerized or rearranged starch derived by heat and/or acid treatment, are branch chain dextrins, for example, canary dextrins, which are obtained by depolymerization and rearrangement of starch; others are dry acid catalyzed thermally decomposed dextrins like British Gum.

The inventioin will now be described with reference to the following series of operative examples describing procedures for preparing hydrogenated saccharides and employing same to advantage in accordance with the precepts of the present invention.

EXAMPLE I 125 grams corn syrup (42 D.E.) were dissolved in 250 mls. water and cooled to 5° C. Sodium borohydride solution (0.5 N) was slowly added to the corn syrup solution until reduction was complete as measured by the Fehling reducing sugar test. The reduced polysaccharide was then further stirred at room temperature for several hours and thereafter treated with ion exchange resins (Rohm & Haas) (IR–120 (H+)), the reaction mixture being treated successively with three portions of the ion exchange resins in three separate quantities (30, 50 and 150 mls.) after which the reaction mixture was passed through an IR–120 (H+) column containing 250 mls. of said resin. As a result of this treatment, the product of the reaction mixture was purified by removal of sodium. The purified reaction product at this point contained, in addition to the reduced saccharides, water and boric acid. The water was then removed by evaporation to dryness under reduced pressure on a rotary evaporator at 45° C. and 8 millimeters absolute pressure. Thereafter boric acid was removed from the dried product by adding successively four 300 ml. portions of methanol and distilling same under reduced pressure, whereby the boric acid was removed as methyl borate.

By the foregoing procedure 92 grams of substantially anhydrous reduced polysaccharides were produced which, when analyzed for reducing sugar, had less than a detectable amount, analysis being conducted by the Samagyi method.

Whereas the foreging starch hydrolyzate (i.e., the 42 D.E. starch conversion syrup) before such reduction by analysis was found to contain 7% dextrose, 48% maltose, 12% maltotriose and 33% higher saccharides, the reduction product contained 4.3% sorbitol and 45.8% maltitol, representing the reduced counterparts of dextrose and maltose respectively as measured by gas chromatography, the balance of the reduced polysaccharides representing higher polyglucose chains having terminal hexitol units.

EXAMPLE II

The hydrogenated saccharide reaction product produced by the process set forth in Example I was incorporated into an intermediate moisture animal food product having the following formulation:

| Dry, non-meat ingredients: | Parts by weight |
|---|---|
| Soy flakes | 137.25 |
| Reduced polysaccharides | 96.75 |
| Soy hulls | 13.5 |
| Dicalcium phosphates (50% granular and 50% powder) | 13.5 |
| Dry non-fat milk solids | 10.8 |
| Sodium chloride | 1.8 |
| Vitamines, colors and minerals | 9.05 |
| Potassium sorbate | 1.35 |
| Liquid ingredients: | |
| Propylene glycol | 9.0 |
| Bleachable fancy tallow | 4.5 |
| Mono- and di-glycerides | 4.5 |
| Corn syrup solids | 9.0 |
| Meat constituents: | |
| Tripe—bovine | 54.0 |
| Udders—bovine | 54.0 |
| Beef cheek trimmings | 36.0 |

The foregoing ingredients were compounded into a meat-containing patty in the following manner. The liquid premix ingredients were melted in a steam jacketed Hobart mixing bowl (5 quart) and the meat mixture after having been ground was added to the liquefied mix with continuous agitation for approximately 16 minutes. Thereafter the dry mix ingredients were added to the slurry resulting after such heating and the slurry and dry mix constituents were mixed for an additional five minute period. During the process of admixing the liquid premix and the meat ingredients, the slurry was elevated to a temperature in the neighborhood of 180° to 200° F. and maintained at said temperature for a period in the neighborhood of 10 minutes, during which time the meat constituents were substantially pasteurized, substantially as set forth in Burgess et al. Pat. No. 3,202,514, dated Aug. 24, 1965, entitled "Animal Food and Method of Making the Same." Thus, the dry mix ingredients were added to the slurry and similarly elevated to a temperature at which said ingredients were substantially pasteurized to the end that the mixed ingredients after five minutes were substantially pathogenfree and represented a heterogeneous mixture wherein the ingredients were uniformly distributed throughout. Thereafter the mixture was cooled and extruded by a Hobart grinding attachment into strands which were in turn subdivided and hand molded into patties which were then wrapped in a cellophane wrapping material and set aside for storage and color studies which will be set forth herein as part of operative Example III.

EXAMPLE III

The foregoing reduced polysaccharides set forth in operative Example I were tested in a model Maillard system deemed to be fairly representative of those agents responsible for a browning reaction in an intermediate moisture pet food product of the type set forth in operative Example II, to-wit, a system compounded from lysine, iron, sodium dihydrogen phosphate and water in addition to test saccharides. Each of the systems was prepared in accordance with the following formulation:

| Model system formulation: | Weight percent in model system, grams |
|---|---|
| Test saccharide | 26.34 |
| Lysine | 2.00 |
| Sodium dihydrogen phosphate | 3.77 |
| Ferric chloride | 0.04 |
| Water | 32.15 |

Representative model solutions containing various saccharides to be tested were prepared and heated in a water bath maintained at 30° C. for a time interval of 50 days during which samples were evaluated for comparative color development, the results of said color development are tabulated hereinbelow:

| Test saccharide: | Model system (hours to brown) |
|---|---|
| Dextrose | 86 |
| Corn syrup solids (D.E. 10) | 444 |
| Sucrose | 782 |
| Borohydride reduced polysaccharides of Example I (in excess of) | 1200 |

Color development reading of the reduced saccharide was terminated after 1200 hours inasmuch as the color had not developed to a detectable extent employing the analytical procedure set forth hereinbelow. The foregoing tabulation of "Hours to Brown" represents the respective recorded number of hours required for the test saccharide-containing solution to develop an optical density reading of 0.50 at 500 millimicron as measured in a Beckman DU spectrophotometer, the light source being a tungsten bulb, an optical density of 0.50 representing a 68.3% reduction in light transmittancy by the model system solution of the energy source.

Following the foregoing procedure, the reduced polysaccharide sample in the foresaid model system had an optical density value of 0.244, after 1200 hours, i.e., only 43.0% of the light energy detectable by the spectrophotometer from the light source in a clear solution could be measured.

The foregoing data indicates the eminent resistance to color development of the reduced polysaccharides in the intermediate moisture product set forth in Example II.

EXAMPLE IV

The product of Example II was subjected to storage at 100° F. (70% relative humidity) and evaluated on a Gardner Automatic Color Difference Meter which operates on the Hunter principle for measuring light value, employing a standard white porcelain tile calibrated with reference to pure magnesium carbonate. The foregoing sample of Example II was evaluated under such accelerated storage for a period of 4 months. The sample had an (L value) of 34.2 at 0 time, 37.1 at 2 months, 41.7 at four monts indicating that there was no significant darkening of product during this period of time.

EXAMPLE V

The following is an example of corn syrup reduction by hydrogenation to produce reduced polysaccharides for use in accordance with the present invention:

Seven liters of 42 D.E. corn syrup with a solids content of 40% was deashed by MB–1 resin (Rohm and Haas) and placed in a three gallon hydrogenation vessel. 425 ml. of an aqueous suspension of Raney Nickel Catalyst was added to the syrup and the autoclave charged with hydrogen to 2,000–2,500 lbs. pressure in the usual manner. The autoclave was stirred and slowly heated to a temperature of 207° F. and maintained at this temperature until the absorption of hydrogen had leveled off, about 3½ hours.

The reaction mixture was allowed to cool to room temperature, and the catalyst was removed by filtration using a Buchner funnel and a bed of analytical grade diatomaceous earth. Dissolved nickel and other salts in the reaction mixture were removed by putting the syrup through two ion exchange resins [Amerlyst 15 and IRA–45 (Rohm and Haas)]. The syrup was lyophilized to yield a white, low moisture solid. Analysis indicated that it contained less than 20 p.p.m. of nickel and had a reducing sugar content less than 0.1% (as glucose).

The foregoing reduced corn syrup can be substituted for the hydrogenated saccharides of Example II and employed to formulate a bacteriologically stable intermediate moisture animal food product which, after processing and packaging, as set forth in said example, will not exhibit undesirable color development, i.e., a progressive darkening of the product to a black condition, but rather will be substantially color stable.

EXAMPLE VI

The following is a further example of corn syrup reduction by hydrogenation to provide reduced polysaccharides of use in intermediate moisture products in accordance with this invention:

A corn flour syrup was prepared by enzymatic hydrolysis of corn flour. After centrifugation and concentration, the syrup had a 40% solids content and was about 42 D.E. on an anhydrous basis.

Two samples of corn flour syrup were hydrogenated, one with prior deashing and one without deashing and both were effectively reduced as follows. One of the samples had been deashed by ion exchange resins prior to hydrogenation and the other contained the dissolved salts derived from corn flour. In each case, 1500 mls. of syrup was hydrogenated in a one gallon autoclave equipped to vigorously stir the syrup therein, hydrogen being introduced at a pressure of 2,000 p.s.i. after the addition of 75 cc. of Raney Nickel catalyst, the temperature of the reaction being maintained at 270–280° F. for 1½ hours. The hydrogenated syrups were filtered, deashed, and dried as previously described. The products were white powders with a D.E. less than 0.1.

This reduced hydrogenated corn flour syrup thus produced can be substiuted to like advantage for the reducing polysaccharides of Example II and, as in the case of the product formulated in the preceding example, will result in a color stable product which does not darken upon storage under the conditions described.

The most advantageous use of the reduced starch hydrolyzate will be as a solute for use in intermediate moisture foodstuffs of the type illustrated in the aforesaid Burgess et al. patent and wherein the reduced starch hydrolyzate is employed as part of the water soluble solids, typically at a concentration ranging anywhere from 1 to in excess of 50% of the water soluble solids employed to stabilize the matrix materials in which said solids are infused; preferably such a composition will have a moisture content in excess of 15% and will usually be less than 35%.

Whereas the invention finds utility in total or partial substitution for reducing saccharides employed in solutes for bacteriostatic stabilization of intermediate moisture foods, the use of reduced polysaccharides is not to be confined to any such application in accordance with the invention. Hence, since the reduced polysaccharides generally have a bland character which is organoleptically compatible with other foods and is physiologically acceptable at reasonable levels in such foods wherein bacteriostasis is desired, the reduced polysaccharides may be employed in accordance with the invention in a wide range of foodstuffs calling for an economic stabilizing solute. This latter advantage stems from the ability to reduce cereal and tuber polysaccharides derived by economical methods from inexpensive sources, thereby providing a cheap while functional source of stabilized solutes compatible with conditions encountered in intermediate moisture foods, which conditions may or may not involve non-enzymatic browning.

Although this invention has been described with reference to specific examples, it will be obvious to those skilled in the art that various modifications may be made thereto which come within the scope of this invention.

What is claimed is:

1. In the treatment of intermediate moisture food products having a moisture content of 10–40%, the improvement which comprises incorporating into said intermediate moisture food products, a stabilizing amount of water soluble reduced edible polysaccharides selected from the class consisting of partial starch hydrolyzates and partially depolymerized rearranged starch in which the aldehydo groups have been converted to methylol groups; said reduced polysaccharides comprising a mixture of sorbitol, maltitol, and a balance of reduced polysaccharides representing higher polyglucose chains having terminal hexitol units.

2. The process set forth in claim 1 wherein said reduced polysaccharide is incorporated in an intermediate moisture food product as part of an aqueous solution which is infused throughout a matrix in amounts sufficient to stabilize said matrix against development of undesirable spoilage organisms.

3. The process set forth in claim 2 wherein said foodstuff contains processed animal tissue.

4. An intermediate moisture food product having a moisture content of 10–40% which contains a stabilizing amount of water soluble reduced edible polysaccharides selected from the class consisting of partial starch hydrolyzates and partially depolymerized rearranged starch in which the aldehydo groups have been converted to methylol groups; said reduced polysaccharides comprising a mixture of sorbitol, maltitol, and a balance of reduced polysaccharides representing higher polyglucose chains having terminal hexitol units.

5. An intermediate moisture food product as set forth in claim 4 containing processed animal tissue.

6. A food product as set forth in claim 4 having a moisture content in excess of 15 and less than 35%, the matrix of said food product having an aqueous solution of water soluble solids infused therein at a level at least equal to the moisture content of the product, the level of reduced starch hydrolyzate being at least 1% by weight of the total water soluble solids.

References Cited

UNITED STATES PATENTS

| | | | |
|---|---|---|---|
| 2,311,235 | 2/1943 | Kuderman | 99—142 |
| 2,917,390 | 12/1959 | Apel et al. | 99—142 |
| 3,202,514 | 8/1965 | Burgess et al. | 99—157 |
| 3,329,507 | 7/1967 | Conrad. | |

LIONEL M. SHAPIRO, Primary Examiner

U.S. Cl. X.R.

99—2, 7, 18, 157